United States Patent [19]
Ito et al.

[11] 3,947,389
[45] Mar. 30, 1976

[54] POLYURETHANE PRODUCT WITH GAS FADING INHIBITOR AND METHOD OF INHIBITING THE GAS FADING OF POLYURETHANE PRODUCT

[75] Inventors: Masatomo Ito; Tsuneo Gotoh, both of Yokohama; Shizuo Nishino, Kyoto, all of Japan

[73] Assignees: Showa Denko Kabushiki Kaisha, Tokyo; Meisei Kagaku Kabushiki Kaisha, Kyoto, both of Japan

[22] Filed: Feb. 27, 1975

[21] Appl. No.: 553,625

Related U.S. Application Data

[62] Division of Ser. No. 413,252, Nov. 6, 1973, abandoned.

[52] U.S. Cl. .................... 260/2.5 BB; 260/45.9 AD
[51] Int. Cl.² ........................................... C08J 3/20
[58] Field of Search ........ 260/2.5 BB, 807, 45.9 AD

[56] References Cited
UNITED STATES PATENTS

| | | | |
|---|---|---|---|
| 3,352,822 | 11/1967 | Yamadera et al. | 260/45.9 |
| 3,395,114 | 7/1968 | Smith | 260/45.95 |

OTHER PUBLICATIONS
Kyon et al., "Chemical Abstracts, " Vol. 72, p. 89, Section No. 33181z (2/1970).

*Primary Examiner*—V. P. Hoke
*Attorney, Agent, or Firm*—Sherman & Shalloway

[57] ABSTRACT

A gas fading inhibitor for polyurethanes, such inhibitor having as its effective component a compound of the formula (I)

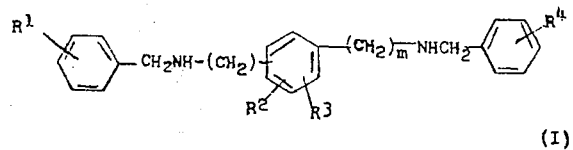

(I)

wherein $R^1$, $R^2$, $R^3$ and $R^4$ are independently selected from the group consisting of hydrogen, methyl and ethyl, and n and m are each an integer from 1 to 3.

10 Claims, No Drawings

POLYURETHANE PRODUCT WITH GAS FADING INHIBITOR AND METHOD OF INHIBITING THE GAS FADING OF POLYURETHANE PRODUCT

This is a division, of application Ser. No. 413,252, filed Nov. 6, 1973 now abandoned.

This invention relates to a gas fading inhibitor suitable for use with the polyurethanes.

It is known generally that the polyurethanes are subject to the influence of such gases as nitrogen oxides, halogens, sulfur oxides and ozone that are contained in air or halogens contained in water which create a discoloring or yellowing phenomenon. This phenomenon is referred to as gas fading. For instance, when polyurethane products are stored or displayed in stores or during their use by the consumers for long periods of time, yellowing of the products takes place in the case of a white product or the color fades in the case of a dyed product thus resulting in a great impairment of the merchandise value of the product. This discoloration in the case of a dyed product is caused by the yellowing of the polyurethane itself rather than the discoloration of the dyestuff used. Lately, environmental pollution, especially in large cities, is becoming increasingly serious as a result of the increase of nitrogen oxides and sulfur oxides in the air as well as from an increase in the use of chlorine for the disinfection treatment of the water supply that has been brought about by the deterioration of the quality of the water source. Hence, it is considered that adequate measures for coping with this situation are required.

Various attempts have been made in the past for prevention of the discoloring or yellowing phenomenon of polyurethanes, i.e., the socalled gas fading phenomenon, and proposals, which consist principally of the use of various additives, have been made. However, most of the conventional additives, though possessing merits, also had shortcomings in that adequate effects were not always obtainable. Often the effects of preventing fading were excellent, but desirable properties inherently possessed by the polyurethanes would be impaired. Another problem was that the durability of the additives to inhibit gas fading was insufficient because of the poor affinity of the additive for polyurethanes. In addition, when the matter of cost and ease of the processing operation is considered, those additives which can be regarded as being of practical use are greatly restricted.

It has now been found that the compounds of the formula

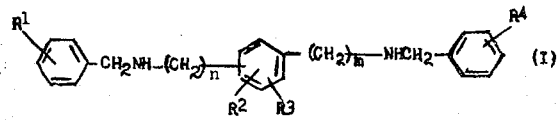

wherein $R^1$, $R^2$, $R^3$ and $R^4$ are independently hydrogen, methyl or ethyl, and n and m are each an integer from 1 to 3, have an excellent action of preventing the gas fading of polyurethanes, this being achieved with no impairment at all of the desirable properties that are inherently possessed by the polyurethanes.

As typical examples of the compounds of the foregoing formula, mention can be made of the dibenzyl derivatives of xylylenediamine and the alkyl substituted products thereof. In addition, also included are those in which the methylene group ($-CH_2-$) in the aforesaid xylylenediamine is substituted by the ethylene group ($-CH_2CH_2-$) or the propylene group ($-CH_2CH_2CH_2-$). However, there is a tendency for the effectiveness to decline as an increase takes place in the number of carbon atoms in these chains, and in the case of those in which the number of carbon atoms exceeds 4, results that are substantially satisfactory cannot be expected. Further, it is preferred that the lower alkylene groups to be bonded to the benzene ring are substituted at either the meta or para position thereof. As specific examples, the following compounds can be conveniently used: N,N'-dibenzyl-(m or p)-xylylenediamine, N,N'-bis(4-methylbenzyl)-(m or p)-xylylenediamine, N,N'-bis(3-methylbenzyl)-(m or p)-xylylenediamine, N,N'-bis(4-ethylbenzyl)-(m or p)-xylylenediamine, N,N'-bis(3-ethylbenzyl)-(m or p)-xylylenediamine, N-benzyl-N'-4-benzyl)-(m or p)-xylylenediamine, N-3-methylbenzyl-N'-4-ethylbenzyl-(m or p)-xylylenediamine, 1,4-bis(benzylamino-ethyl)-benzene, 1,4-bis(benzylaminopropyl)benzene, 1,3-bis(benzylaminoethyl) benzene, 1,3-bis(benzylaminopropyl) benzene, 1,4-bis(4-methylbenzylamino-ethyl)-benzene, 1,3-bis(3-methylbenzylaminoethyl)benzene, 1,4-bis(benzyl-aminomethyl)-2-methylbenzene, 1,3-bis(benzylaminomethyl)-2-methylbenzene, 1,4-bis(4-methylbenzylaminomethyl)-2-methylbenzene, 1,4-bis(benzylaminoethyl)-2-methylbenzene, 1,4-bis(4-methylbenzylaminoethyl)-2-methylbenzene, 1,4-bis(-benzylaminomethyl-2,5-dimethylbenzene, 1,3-bis(benzylaminomethyl)-4,6-dimethylbenzene, 1,4-bis(benzylaminoethyl)2,5-dimethylbenzene and 1,4-bis (4-methylbenzylaminomethyl)-2,5-dimethylbenzene.

The compounds of formula (I) can be prepared by any of the usual methods of synthesis, for example, such methods as submitting xylylenediamine and a benzyl halide to a dehydrohalogenation reaction.

Polyurethane is a generic term denoting a urethane polymer containing in its molecular structure a urethane bond and optionally a urea bond or an acid amide bond. These are formed using as the base an organic di- or polyisocyanate or a di- or polychloroformate for example. Suitable polyurethanes can be obtained by reacting an excess of a diisocyanate with a polyglycol of an average molecular weight of about 500 – 6000, e.g., a dihydroxypolyether, a dihydroxypolyester or a dihydroxypolyhydrocarbon to prepare a prepolymer having terminal isocyanates, then dissolving this in a polar solvent such as dimethylformamide, dimethylacetamide, tetramethylurea, tetrahydrofuran or dimethyl sulfoxide, and thereafter reacting this solution with a functional compound having two active hydrogen atoms, e.g., the diamines, diols or hydrazines.

The gas fading inhibitor for polyurethane according to the present invention, as is apparent from the foregoing generic formula, is characterized in having a symmetric structure in which the benzene rings are connected through imino groups having either methylene or a lower alkylene group on both sides thereof and with the middle benzene ring as the center of the structure. The mechanism by which this compound demonstrates its excellent effect in inhibiting the fading of polyurethanes is not yet fully known. However, according to our findings, when it is considered that the fading of polyurethanes is a phenomenon in which the urethane bonds contained in the polyurethane molecules undergo a kind of oxidative decomposition to be transformed to an isocyanate, following which the isocyanate forms a sort of coloring matter by a further oxidative decomposition or polymerization, it is believed that the compound of formula (I), functioning as an antioxidant, inhibits the decomposition of the aforesaid urethane bonds or, if the urethane bonds have already been decomposed and transformed into isocyanates, the compound of formula (I), functioning as a polymerization inhibitor, checks the polymerization of the isocyanate, with the consequence that compound (I) has the ability to prevent the formation of the coloring matter.

The gas fading inhibitor of the present invention can be effectively applied to any of the polyurethane products. For instance, the invention gas fading inhibitor finds wide application to the various polyurethane products, including such textile products as yarns, woven and knit fabrics, which have been made by using the polyurethane type synthetic fibers, or the foregoing yarns plied with other fibers and the woven or knit union cloth of these fibers with other fibers, as well as films, synthetic leathers, coating materials, foamed shaped articles, etc. The fading inhibitors of the present invention are effective in preventing the fading of these polyurethane products that is caused by means of the usually harmful gases contained in air which are oxidants as, for example, the nitrogen oxides, e.g. $NO_2$, NO, $N_2O$ and $N_2O_3$ and the sulfur oxides, e.g. $SO_2$ and $SO_3$. These compounds are also effective for preventing the fading of textile products when washed in water containing $Cl_2$, or the yellowing of the paint used for painting the white lines of a swimming pool.

The application of the invention gas fading inhibitor can be carried out by incorporating in the polyurethane at least one compound of formula (I) in an effective amount by such means as mixing, dipping, spraying or other suitable procedures. For instance, the foregoing compound can be mixed and kneaded with the starting polyurethane at the time of the spinning of the textile product, processing of the shaped article or preparation of the paint or coating material. Alternately, a polyurethane article that has already been formed can be submitted to an after treatment consisting of either dipping the article in or spraying the article with the foregoing compound to either adhere the surface of the article with the compound or impregnate the compound into the interior of the article. In the case of practically all the fading inhibitors for polyurethane that have been known heretofore, their application has been carried out by mixing the inhibitor in the starting polymer. While the application of the invention inhibitor can be carried out in this manner, it also can be applied by an after treatment to an already formed article. And, if desired, an article that has been formed using a starting polymer in which the foregoing compound has been mixed in advance can be further submitted to an after treatment with the aforesaid compound.

In mixing the foregoing compound in the starting polymer, the procedure consisting in adding the compound directly is suitably employed. On the other hand, when a semi-finished or finished product is to be adhered or impregnated with the compound, it is usually convenient to use the compound in the form of either an emulsifier-incorporated composition or an organic solvent solution. While there is imposed no special restriction as to the amount in which the foregoing compound is used, an amount ranging from 0.1% to 10% by weight based on the polyurethane is usually used. In the case where the compound is mixed in the starting polymer, an amount on the order of 0.5 – 3% by weight is preferred, while in the case the application is by an after treatment, an amount on the order of 2 – 8% by weight is preferred.

As regards the solvents and surfactants to be used in preparing the emulsifier-incorporated composition or solution of the invention inhibitor, preferably used as the solvents are the hydrophilic organic solvents such as the lower alcohols, the lower ketones, dioxane, the polyhydric alcohols, dimethylformamide, dimethyl sulfoxide, dimethylacetamide and acetamide. On the other hand, as the surfactants, usable are the anionic or nonionic surfactants, and mention can be made of such, for example, as the higher alcohol sulfates, the sulfates of the higher alcohol-ethylene oxide adducts, the sulfates of the higher fatty acid-ethylene oxide adducts, sodium alkylbenzenesulfonate, sulfate of castor oil, sulfate of oleic acid, sulfonated products of higher alcohol esters, higher fatty acid-alpha-sulfates, higher alcohol-ethylene oxide adducts, higher fatty acid-ethylene oxide adducts, the ethylene oxide adducts of sorbitan or sorbitol and the ethylene oxide adducts of alkylphenols.

The following examples are given for more fully illustrating the present invention. Unless otherwise specified, the parts and percentages used in the examples are on a weight basis. The anti-gas fading effect was determined by using nitrogen dioxide, the combustion gas of propane used as fuel (this gas contains nitrogen oxides) and a chlorine-containing gas. In the case of nitrogen dioxide, the test method of JIS L0855-1967 was used, while in the case of the combustion gas of propane, the test was carried out in accordance with the method of AATCC 23-1971 (Technical Manual of the American Association of Textile Chemists and Colorists). On the other hand, in the case of the chlorine-containing gas, the text was carried out with a gas having an effective chlorine concentration of 100 ppm. In all instances, the anti-gas fading effect was evaluated, and the degree of fading of the sample, a white polyurethane shaped material, as indicated by their degree of yellowing, was ranked in one of the five classes (i.e., class 5 to class 1). Class 5 denotes that the anti-gas fading effect was excellent, there being practically no yellowing at all, while class 1 denotes that the effect was bad, the yellowing of the sample being extreme. The intermediate classes 4, 3 and 2 denote that the effect was respectively good, fair and poor.

EXAMPLE 1

Thirty parts of polytetramethylene ether glycol having an average molecular weight of 1500 was added to 10 parts of diphenylmethane-4,4'-diisocyanate, after which the resulting mixture was reacted for 60 minutes at 80°C. The resulting intermediate polymer was dissolved in 90 parts of dimethylformamide, and while holding this solution at 0°C., a solution of 1.4 parts of 1,2-propylenediamine in 30 parts of dimethylformamide was added thereto and reacted therewith. After adding to the so obtained polyurethane solution 2%, based on the weight of the polyurethane solids content, of N,N'-dibenzylxylylenediamine separately obtained by reacting a 85°C. a mixture of meta and para xylylene (para isomer content = 29%) with benzyl chloride in the copresence of a 20% aqueous caustic soda solution, the mixture was dry-spun to obtain a polyurethane elastic yarn. The anti-gas fading effects to nitrogen dioxide gas, combustion gas of propane, and chlorine-containing gas are shown below. The control is the instance where the diamine compound was not added. The numerical values indicate the class in the foregoing classification wherein the degree of anti-gas effect was awarded ranking from 5 to 1.

|  | $NO_2$ | Combustion gas of propane | Chlorine |
|---|---|---|---|
| Control | 1 | 1 | 1 |
| Invention product | 5 | 4 | 3 |

EXAMPLE 2

To an intermediate polymer obtained by reacting 75 parts of methylenebis(4-phenylisocyanate) and 230 parts of polytetramethylene ether glycol having an average molecular weight of 1150 were added 3 parts of 4,4'-isopropylidenebis(6-tert-butylmetacresol), 2.5 parts of 2-(2-oxy-5-methyl-phenyl) benzotriazole and 6 parts of titanium dioxide, after which the resulting mixture was dissolved in dimethylformamide and reacted after the addition of 6.7 parts of 1,2-propylenediamine. The so obtained polyurethane solution was then dry-spun to obtain an elastic yarn of 420 denier.

Separately, 32.8 parts of 1,4-diaminomethyl-2,5-dimethylbenzene and 100 parts of 20% caustic soda were heated at 80C. and reacted by adding 50.4 parts of benzyl chloride with stirring to obtain 50 parts of 1,4-bis(benzylaminomethyl)-2,5-dimethylbenzene, to which was then admixed 30 parts of octylphenoxyhexadecylethenoxyethylsulfate soda, 10 parts of a sperm oil alcohol-ethylene oxide adduct and 10 parts of isopropanol with stirring to obtain 100 parts of an emulsifier-incorporated composition.

The foregoing elastic yarn was dipped in a bath consisting of a dispersion of the foregoing emulsifier-incorporated composition in about 20-fold amount of water, following which the excess liquid was removed from the yarn by centrifugation, and the yarn was dried for 2 minutes at 80°C.

The so obtained polyurethane elastic yarn was then submitted to the gas fading test as in Example 1 with the following results.

|  | $NO_2$ | Combustion gas of propane | Chlorine |
|---|---|---|---|
| Control | 1 | 1 | 1 |
| Invention product | 5 | 4 | 2 |

EXAMPLE 3

1. While maintaining 139 parts of a mixture of 2,4-tolylene diisocyanate and 2,6-tolylene diisocyanate of an isomer ratio 65:35 at about 80°C. with well stirring, a mixture of 134 parts of trimethylolpropane and 90 parts of 1,3-butanediol was added dropwise thereto to carry out the reaction. The reaction product was then extracted with a combined solution of ethyl acetate and n-hexane to eliminate the unreacted tolylene diisocyanate and obtain an ethyl acetate solution of a low toxic, high-molecular-weight polyisocyanate containing 14.1% of the NCO group. After adding 17.7% of toluene, this was used as the isocyanate component.

2. A polyester of a hydroxyl value of 290 obtained from adipic acid, phthalic acid and trimethylolpropane and a polyester of a hydroxyl value of 315 obtained from adipic acid, butylene glycol and trimethylolpropane were mixed in a weight ratio of 1:1 followed by the further addition of a 2.5-fold amount of ethyl acetate to obtain the polyester component.

The foregoing components (1) and (2) were mixed in weight ratio of 1:2 followed by the further addition of a white pigment to obtain a white coating solution. To the so obtained coating solution was admixed 2%, based on the weight of polymeric solids content, of 1,4-bis(paramethylbenzylaminoethyl)benzene obtained by reacting, as in Example 1, 1,4-bis(beta-aminoethyl) benzene and paramethylbenzyl chloride, after which the resulting mixture was solidified on a sheet glass to obtain a coating material. The so obtained coating material was then tested as in Example 1 with the following results.

|  | $NO_2$ | Combustion gas of propane | Chlorine |
|---|---|---|---|
| Control | 1 | 1 | 1 |
| Invention product | 5 | 5 | 3 |

EXAMPLE 4

To the same polymeric solution as that obtained in Example 1 were severally added 1.5%, based on the solids content of the polymer, of various compounds according to formula (1), following which the resulting mixtures were molded into 1-mm-thick sheets with an extrusion molder. The so obtained several sheets were then tested as in Example 1 with the following results.

| Gas fading inhibitor | $NO_2$ | Combustion gas of propane | Chlorine |
|---|---|---|---|
| Control | 1 | 1 | 1 |
| N,N'-bis(4-ethylbenzyl)m-xylylenediamine | 5 | 5 | 3 |
| N,N'-bis(3-methylbenzyl)p-xylylenediamine | 5 | 5 | 3 |
| 1,3-bis(dibenzylaminoethyl)benzene | 5 | 4 | 2 |
| N-benzyl-N'-4-methylbenzyl-p-xylylenediamine | 5 | 5 | 3 |
| 1,4-bis(dibenzylaminopropyl)benzene | 4 | 3 | 2 |

-continued

| Gas fading inhibitor | $NO_2$ | Combustion gas of propane | Chlorine |
|---|---|---|---|
| 1,4-bis(dibenzylaminoethyl)2,5-dimethylbenzene | 5 | 4 | 2 |
| N,N'-bis(4-methylbenzyl)m-xylylenediamine | 5 | 5 | 3 |
| 1,4-bis(dibenzylaminoethyl)benzene | 5 | 4 | 3 |
| 1,4-bis(4-methylbenzylaminoethyl)2,5-dimethylbenzene | 5 | 5 | 3 |

What is claimed is:

1. A method of inhibiting the gas fading of polyurethane products which comprises incorporating therein a compound of the formula (I):

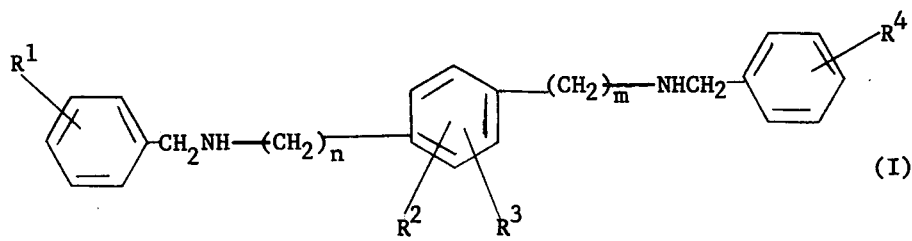

wherein $R^1$, $R^2$, $R^3$ and $R^4$ are independently selected from the group consisting of hydrogen, methyl and ethyl, and n and m are each an integer from 1 to 3.

2. Polyurethane product having improved resistance to gas fading consisting essentially of polyurethane and a compound, as the gas fading inhibitor, of the formula,

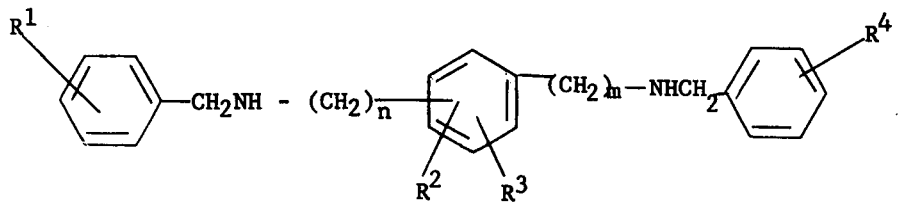

wherein $R^1$, $R^2$, $R^3$, and $R^4$ are independently selected from the group consisting of hydrogen, methyl and ethyl, and n and m are each an integer from 1 to 3, in the amount of from about 0.1 to about 10% by weight of the polyurethane.

3. Polyurethane product of claim 2 wherein said compound is N,N'-dibenzylxylylenediamine.

4. Polyurethane product of claim 2 wherein said compound is 1,4-bis(benzylaminomethyl)-2,5-dimethylbenzene.

5. Polyurethane product of claim 2 wherein said compound is 1,4-bis(paramethylbenzylaminoethyl) benzene.

6. Polyurethane product of claim 2 wherein the polyurethane product is a textile product.

7. Polyurethane product of claim 2 wherein the polyurethane product is a film.

8. Polyurethane product of claim 2 wherein the polyurethane product is a synthetic leather.

9. Polyurethane product of claim 2 wherein the polyurethane product is a coating material.

10. Polyurethane product of claim 2 wherein the polyurethane product is a foamed shaped article.

* * * * *

UNITED STATES PATENT AND TRADEMARK OFFICE
CERTIFICATE OF CORRECTION

PATENT NO. : 3,947,389
DATED : March 30, 1976
INVENTOR(S) : ITO, ET AL.

It is certified that error appears in the above-identified patent and that said Letters Patent are hereby corrected as shown below:

Item 73, line 2, after "Kagaku" insert -- Kogyo --

Signed and Sealed this

Sixteenth Day of November 1976

[SEAL]

Attest:

RUTH C. MASON
*Attesting Officer*

C. MARSHALL DANN
*Commissioner of Patents and Trademarks*